US005821476A

United States Patent [19]

Hakala et al.

[11] Patent Number: 5,821,476

[45] Date of Patent: Oct. 13, 1998

[54] DEVICE FOR EMERGENCY OPERATION OF AN ELEVATOR MOTOR

[75] Inventors: Harri Hakala; Jorma Mustalahti, both of Hyvinkää; Esko Aulanko, Kerava, all of Finland

[73] Assignee: Kone Oy, Helsinki, Finland

[21] Appl. No.: 618,768

[22] Filed: Mar. 20, 1996

[30] Foreign Application Priority Data

Mar. 24, 1995 [FI] Finland .................................. 951428

[51] Int. Cl.[6] .................................. B66B 1/06; H02P 1/00

[52] U.S. Cl. .......................................... 187/290; 318/441

[58] Field of Search ............................ 187/290; 318/106, 318/105, 107, 440, 441, 442, 439; 307/132 R, 132 F

[56] References Cited

U.S. PATENT DOCUMENTS

| | | | |
|---|---|---|---|
| 1,598,268 | 8/1926 | De Coninck | 318/148 |
| 2,701,033 | 2/1955 | Chiselbrook | 187/29 |
| 3,658,156 | 4/1972 | Abbot | 187/29 R |
| 3,863,123 | 1/1975 | Godard et al. | 318/440 |
| 4,024,455 | 5/1977 | Yarrow et al. | 321/29 |
| 4,376,471 | 3/1983 | Uchino et al. | 187/29 R |

FOREIGN PATENT DOCUMENTS

| | | |
|---|---|---|
| 1083017 | 3/1994 | China . |
| 0248754 | 12/1987 | European Pat. Off. . |
| 51-149647 | 12/1976 | Japan . |
| 58-188280 | 11/1983 | Japan . |
| 1313283 | 12/1989 | Japan . |

*Primary Examiner*—Robert Nappi

[57] ABSTRACT

Device (100) for rotating an elevator motor during an emergency situation, such as a power failure, comprising a d.c. supply (4) and a rotary switch (8) used as a switching device for supplying a d.c. voltage into the windings (R-S, R-T, S-T) of the elevator motor (1). The d.c. voltage (DCC+, DCC–) controlled by the rotary switch is fed by turns into each winding (R-S, R-T, S-T). In addition, the device comprises a switch (6) used to supply a voltage to the brake (3) and to short-circuit the windings.

6 Claims, 1 Drawing Sheet

DEVICE FOR EMERGENCY OPERATION OF AN ELEVATOR MOTOR

BACKGROUND OF THE INVENTION

The present invention relates to a device for operating an elevator motor in an emergency, such as a power failure.

According to elevator regulations, when an elevator stops between landings, there must be a possibility of moving the elevator car to a suitable landing. For this purpose, several methods are used, such as releasing the brake manually using a suitable tool. If the position and load of the elevator are such that the elevator can start moving, then releasing the brake is an applicable method. If the elevator and its counterweight are in equilibrium, it is additionally necessary to rotate the elevator motor by some means.

At present, battery-operated inverters are used for this purpose. However, they are expensive and more susceptible to malfunctions than manual methods. U.S. Pat. No. 4,376,471 presents a method involving the use of an inverter during an emergency. However, this does not solve the problem of the elevator being stopped due to a disturbance occurring in the inverter itself.

There are also elevator machines implemented using a synchronous motor with permanent magnets, such as e.g. the one presented in PCT/FI94/00285.

The object of the present invention is to produce a simple and cheap solution whereby an elevator car driven by an elevator motor provided with permanent magnets can be moved during an emergency, especially in a situation where the elevator car is in a state of equilibrium and cannot be set in motion by the gravitational force.

SUMMARY OF THE INVENTION

To achieve the objectives stated above, the device of the invention includes a d.c. power supply, switching device for alternately feeding d.c. voltage (DC+, DC−) to windings of the motor, and an actuator for releasing the elevator brake.

The battery operated device for emergency operation of an elevator motor is very advantageous in respect of price. It uses a small battery, and the devices used to switch current to the elevator motor, such as switches and diodes, typically have current ratings of only about 5–10 A and are therefore cheap. Even together with a d.c. supply, the emergency operation device of the invention is so small and light that an elevator installer can easily carry it along.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
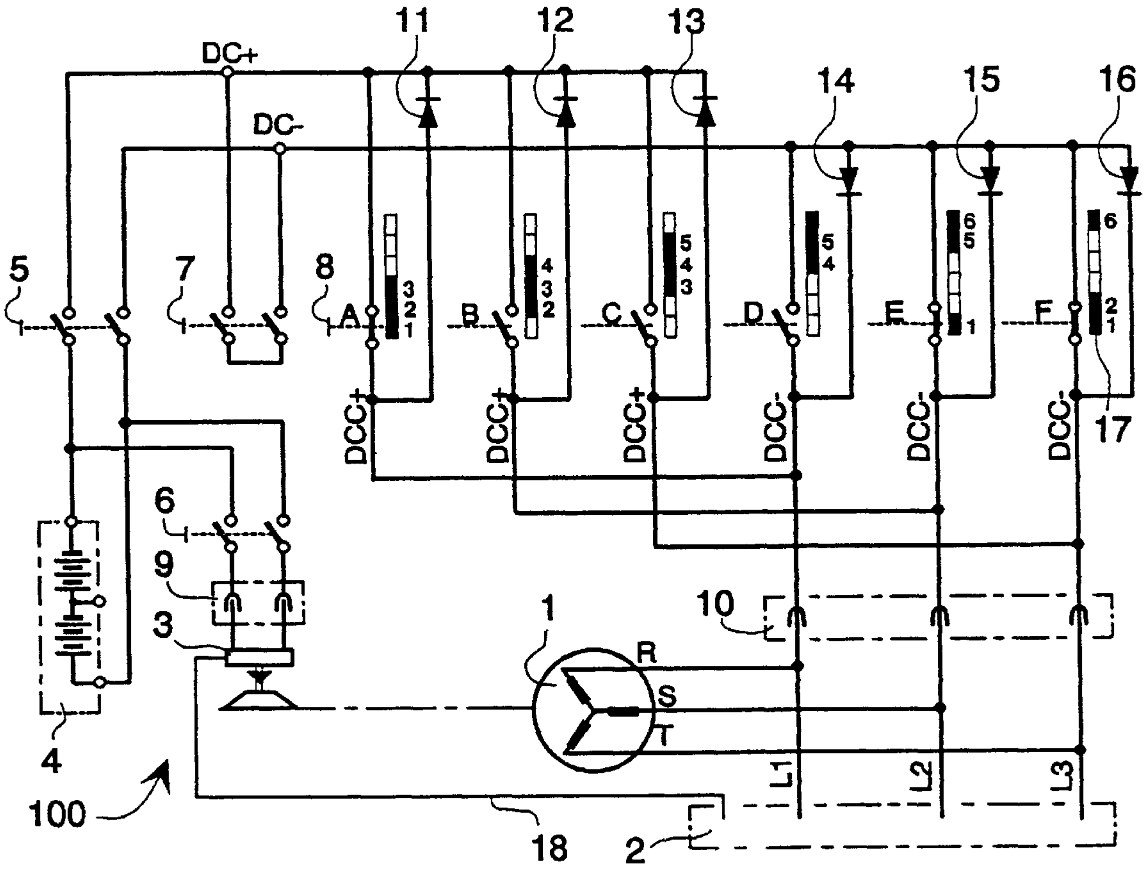
FIG. 1 presents the circuit diagram of an embodiment of the device of the invention.

FIG. 1 presents the circuit diagram of a circuit arrangement for the device 100 of the invention. In normal operation, the elevator motor 1, e.g. a synchronous motor with permanent magnets, receives its three-phase operating voltage L1-L2-L3, and the brake 3 its operating voltage 18, through the elevator drive 2. In the event of an emergency, e.g. when the elevator stops between landings, the voltages DC+/DC− of the d.c. supply 4 are fed as d.c. voltages DCC+and DCC− under control of a rotary switch 8 alternately into each one of the windings R-S, R-T and S-T of the elevator motor. The d.c. supply is preferably an accumulator or battery.

The rotary switch has six contacts, A, B, C, D, E and F. The full 360° rotation angle of the rotary switch is divided into six parts, i.e. one step of the rotary switch corresponds to 60 degrees. Each contact A . . . F is closed during three successive 60-degree steps. 'Rotary switch' means that the switch can be rotated continuously in both directions, repeating the same switching function during each revolution. The bar 17 depicted beside the switch describes the closed states of the switching functions A–F, the black numbered area representing the steps during which the switch is closed. Alternatively, the rotary switch may have a number of contacts A . . . F equaling a multiple of six, in which case the operating interval for each contact would be equal to the angle of a full revolution, three hundred and sixty (360) degrees, divided by the same multiple of six.

The d.c. supply voltages DC+ and DC− are passed via a double-pole switch 5 to the six contacts of the rotary switch, DC+ being applied to contacts A–C and DC− to contacts D–F. The contacts are connected in pairs A–D, C–E and D–F on one side, and the d.c. voltage DCC+/DCC− controlled by the rotary switch is further passed to the elevator motor 1 via a three-phase plug 10. Connected across each contact A–C is one of the commutating diodes 11–13 with DC+ as their discharge direction, and similarly, across contacts D–F there is connected one of the commutating diodes 14–16 with DC− as their discharge direction. Through the commutating diodes, the inductance energy returning from a winding of the elevator motor 1 is discharged into another winding.

To release the brake 3, the brake is fed with a d.c. voltage from the d.c. supply 4, controlled by switch 6.

In addition, the circuit is provided with a shorting switch 7, by means of which the d.c. terminals DC+ and DC− on the input side of the rotary switch 8 can be short-circuited when they are not carrying a voltage. Alternatively, the windings could naturally be shorted directly at the terminals R-S-T of the elevator motor.

To rotate the elevator motor 1 in the up or down direction in an emergency, the following procedure is applied:

The main switch 5 of the d.c. supply is closed to supply a voltage to the rotary switch 8 and the brake is released by closing switch 6. Via three rotary switch contacts, a positive voltage is now connected to one of the elevator motor windings and a negative voltage to the other two windings, depending on the position of the rotary switch. The magnetic field of the elevator motor turns through 60 electric degrees and the shaft of the elevator motor jerks into another position. By turning the rotary switch to the next position, the voltages supplied to the windings are changed and the magnetic field is turned by another 60 degrees for each step. This process is carried on until the elevator reaches the nearest landing, at which time the brake is closed and the d.c. supply main switch 5 can be opened. In practice, the elevator moves through a distance of a few centimeters for each step of the rotary switch, e.g. from position A→B. When the rotary switch is in the position shown in FIG. 1, it passes the positive voltage via contact A to winding terminal R of the elevator motor 1 and the negative voltage to windings S and T via contacts E and F.

In this connection it may be noted that supplying a d.c. voltage into the motor windings to brake the motor is known in itself, but that is not the purpose of the present invention, but to rotate the elevator motor slowly in steps using a d.c. current especially in motor load situations where the elevator and its counterweight are in a state of equilibrium and releasing the brake will not set the elevator in motion.

When under supervision, the device 100 of the invention for emergency operation of an elevator can also be left in a state in which the main switch 5 is open, the brake switch 6 is closed (the brake being released) and the shorting switch 7 also closed. When the elevator starts to move e.g. due to gravity, an electromotive force is set up in the short-circuited windings of the elevator motor, developing a torque in the motor, and the elevator is able to descend or ascend in a controlled manner, the direction of motion being determined by the elevator load.

Figure 2:
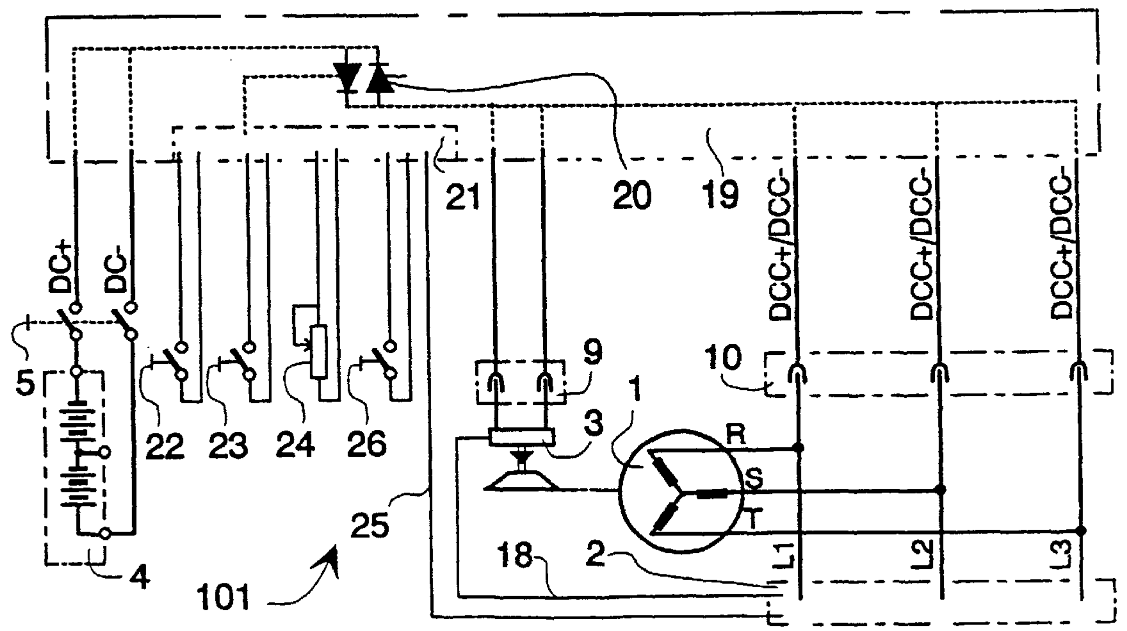
FIG. 2 presents the device of the invention implemented using simple electronics.

FIG. 2 presents another embodiment of the device 101 of the invention, implemented using solid state switches. Each contact A–F of the rotary switch 8 has been replaced with a solid state switch 20 and their control unit 21. The output of the circuit gives the same controlled d.c. voltages DCC+/DCC− to the elevator motor as in the embodiment in FIG. 1. In this case, the desired up/down direction of motion is controlled by switches 22 and 23, corresponding to the direction of rotation of the rotary switch. The circuit comprises a speed setting device 24, preferably a potentiometer, corresponding to the speed of rotation of the rotary switch. Switch 26 serves to release the brake 3. The function of the device 101 is the same as with the device 100 in FIG. 1, i.e. the d.c. voltage fed into the elevator motor is stepped from winding to winding, causing the elevator motor 1 to rotate in jerks. This embodiment, too, is advantageous in respect of price and can easily be carried by an elevator installer.

It is obvious to a person skilled in the art that the embodiments of the invention are not restricted to the examples described above, but that they may instead be varied in the scope of the following claims.

We claim:

1. A device for rotating a synchronous elevator motor to move the elevator in the up or down direction during an emergency situation, such as a power failure, said device comprising:

a d.c. power supply;

switching devices for feeding a d.c. voltage from said d.c.

power supply into the windings of the synchronous elevator motors; and an actuator for releasing a brake, wherein said switching devices feed the d.c. voltage of said d.c. power supply alternately into each winding of the synchronous elevator motor independent of any particular timing sequence.

2. The device according to claim 1, wherein said switching devices are controlled by a rotary switch having a number of contacts equal to a multiple of six, the operating interval of each contact being three hundred and sixty degrees divided by the multiple of six.

3. The device according to claim 2, wherein, when the synchronous elevator motor is to be rotated in the up direction of the elevator, the rotary switch is rotated in one direction, and when the synchronous elevator motor is to be rotated in the down direction, the rotary switch is rotated in an opposite direction.

4. The device according to claim 2, further comprising a plurality of commutating diodes, one commutating diode being connected in parallel with each one of the contacts of the rotary switch, said commutating diodes serving to discharge the inductance energy of the windings of the synchronous elevator motor into another winding.

5. The device according to claim 1 wherein, to enable the brake to be released, the device is provided with a switch through which the brake is fed with a voltage from said d.c. power supply.

6. The device according to claim 1 further comprising:

a short-circuiting switch with which the windings of the synchronous elevator motor can be short-circuited either by shorting the d.c. terminals (DC+, DC−) supplying the rotary switch when no voltage is connected to said terminals or by shorting the terminals of the synchronous elevator motor windings directly.

* * * * *